(12) United States Patent
Garcia et al.

(10) Patent No.: US 12,465,133 B2
(45) Date of Patent: Nov. 11, 2025

(54) MODIFIED LUGGAGE CARRIER

(71) Applicant: HAPPY NOMAD INTERNATIONAL, LLC, Miami, FL (US)

(72) Inventors: Nicole Garcia, Miami, FL (US); Dayana Parra, Miami, FL (US); Beatrice Hilland, Miami, FL (US)

( * ) Notice: Subject to any disclaimer, the term of this patent is extended or adjusted under 35 U.S.C. 154(b) by 324 days.

(21) Appl. No.: 18/284,829

(22) PCT Filed: Mar. 29, 2021

(86) PCT No.: PCT/US2021/024669
§ 371 (c)(1),
(2) Date: Sep. 28, 2023

(87) PCT Pub. No.: WO2021/195625
PCT Pub. Date: Sep. 30, 2021

(65) Prior Publication Data
US 2024/0315429 A1    Sep. 26, 2024

Related U.S. Application Data

(60) Provisional application No. 63/000,686, filed on Mar. 27, 2020.

(51) Int. Cl.
*A45F 4/02*        (2006.01)
*A45C 13/30*       (2006.01)
(Continued)

(52) U.S. Cl.
CPC ............... *A45F 3/04* (2013.01); *A45C 13/30* (2013.01); *A45C 13/385* (2013.01); *A45F 3/005* (2013.01);
(Continued)

(58) Field of Classification Search
CPC ... A45C 7/0086; A45C 13/1069; A45C 5/143; A45C 5/14; A45C 13/30; A45F 3/04;
(Continued)

(56) References Cited

U.S. PATENT DOCUMENTS 5,230,450 A * 7/1993 Mahvi ............... A45C 9/00
190/110
6,692,072 B2   2/2004 Nelson et al.
(Continued)

FOREIGN PATENT DOCUMENTS

WO    WO2019006015 A1    1/2019

*Primary Examiner* — Adam J Waggenspack
(74) *Attorney, Agent, or Firm* — Sanchelima & Associates, P.A.; Jesus Sanchelima; Christian Sanchelima

(57) ABSTRACT

A luggage carrier includes a plurality of compartments that are located on the front face of the carrier. Each of the compartments include a flap hingedly engaged with their respective compartment. The flaps are lined with magnetic members which are engaged to a magnetic locking strip located within the compartment to effectively seal each compartment. A webbing strap is then secured over the front face of the carrier to provide support over the compartments. Additionally, a waist pack ecosystem is included with the system. The waist pack receives a plurality of compartments that can be mounted thereon. A sling assembly and trolley assembly may also be included with system to effectively create a seating transportation means for a child.

18 Claims, 12 Drawing Sheets

(51) Int. Cl.
*A45C 13/38* (2006.01)
*A45F 3/00* (2006.01)
*A45F 3/04* (2006.01)
*A45F 3/12* (2006.01)
*B62B 1/14* (2006.01)

(52) U.S. Cl.
CPC ................. *A45F 3/12* (2013.01); *B62B 1/14* (2013.01); *A45C 2013/306* (2013.01); *A45F 2003/003* (2013.01); *B62B 2202/24* (2013.01)

(58) Field of Classification Search
CPC ... A45F 3/005; A45F 3/02; A45F 4/02; B62B 2202/24; B62B 3/02; B62B 5/082; B62B 1/14; A47D 1/10
USPC ....................................................... 224/577
See application file for complete search history.

(56) References Cited

U.S. PATENT DOCUMENTS

| | | | |
|---|---|---|---|
| 6,899,346 B2* | 5/2005 | Pfeiffer | A45C 5/143 190/110 |
| 9,254,857 B2* | 2/2016 | Fiebelkorn | A45C 5/14 |
| 10,611,393 B1* | 4/2020 | Simon | B62B 5/082 |
| 2004/0026294 A1* | 2/2004 | Platte, III | A45C 5/065 206/575 |
| 2007/0193902 A1* | 8/2007 | Myers | A45C 13/1069 206/320 |
| 2008/0042379 A1 | 2/2008 | Amran | |
| 2009/0218186 A1* | 9/2009 | Sherr | A45C 13/1069 190/111 |
| 2011/0304181 A1 | 12/2011 | Scott | |
| 2013/0292441 A1* | 11/2013 | Shen | A45F 4/02 224/579 |
| 2019/0328093 A1 | 10/2019 | Newman | |

* cited by examiner

MODIFIED LUGGAGE CARRIER

BACKGROUND OF THE INVENTION

1. Field of the Invention

The present invention relates to a luggage carrier and, more particularly, to a luggage carrier that includes a plurality of compartments accessed from a front face of the carrier, the system also includes a waist pack ecosystem.

2. Description of the Related Art

Several designs for a luggage carrier have been designed in the past. None of them, however, include a luggage carrier which includes a plurality of compartments that are located on the front face of the carrier. Each of the compartments include a flap hingedly engaged with their respective compartment. The flaps are lined with magnetic members which are engaged to a magnetic locking strip located within the compartment to effectively seal each compartment. A webbing strap is then secured over the front face of the carrier to provide support over the compartments. Additionally, a waist pack ecosystem is included with the system. The waist pack receives a plurality of compartments that can be mounted thereon. A sling assembly and trolley assembly may also be included with system to effectively create a seating transportation means for a child. It is known that children often need specialized luggage carriers to suit their traveling and educational needs. Therefore, there is a need for a luggage carrier system to suit the child's needs.

Applicant believes that a related reference corresponds to U.S. Pat. No. 6,692,072 issued for a booster seat with a base having a lower surface sized to rest upon a chair seat and an upper surface parallel to the lower surface. Applicant believes that another related reference corresponds to U.S. patent publication 2019/0328093 issued for a luggage apparatus capable of being used in normal mode and alternately in child carrying mode. Furthermore, applicant believes the following patent literature can be used for further reference: US2009/0218186; US2013/0292441; US2007/0193902; US2011/0304181; US2008/0042379; and WO2019/06015. However, the cited references differ from the present invention because they fail to teach of the plurality of compartments on the front face of the carrier supported by a strap. Additionally, the references fail to disclose a sling and trolley assembly to enable a transportation means.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a modified luggage carrier which provides easily accessible compartments for a user which are located on the front face of the carrier It is another object of this invention to provide a modified luggage carrier system which provides an magnetic seal system with a re-enforced webbing strap to maintain the compartments in a closed configuration to prevent their contents from falling out.

It is still another object of the present invention to provide a modified luggage carrier which provides a sling and trolley assembly to enable an enjoyable transport means for a child.

It is still another object of the present invention to provide a modified luggage carrier that includes a waist pack ecosystem to provide additional storage to an adult It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
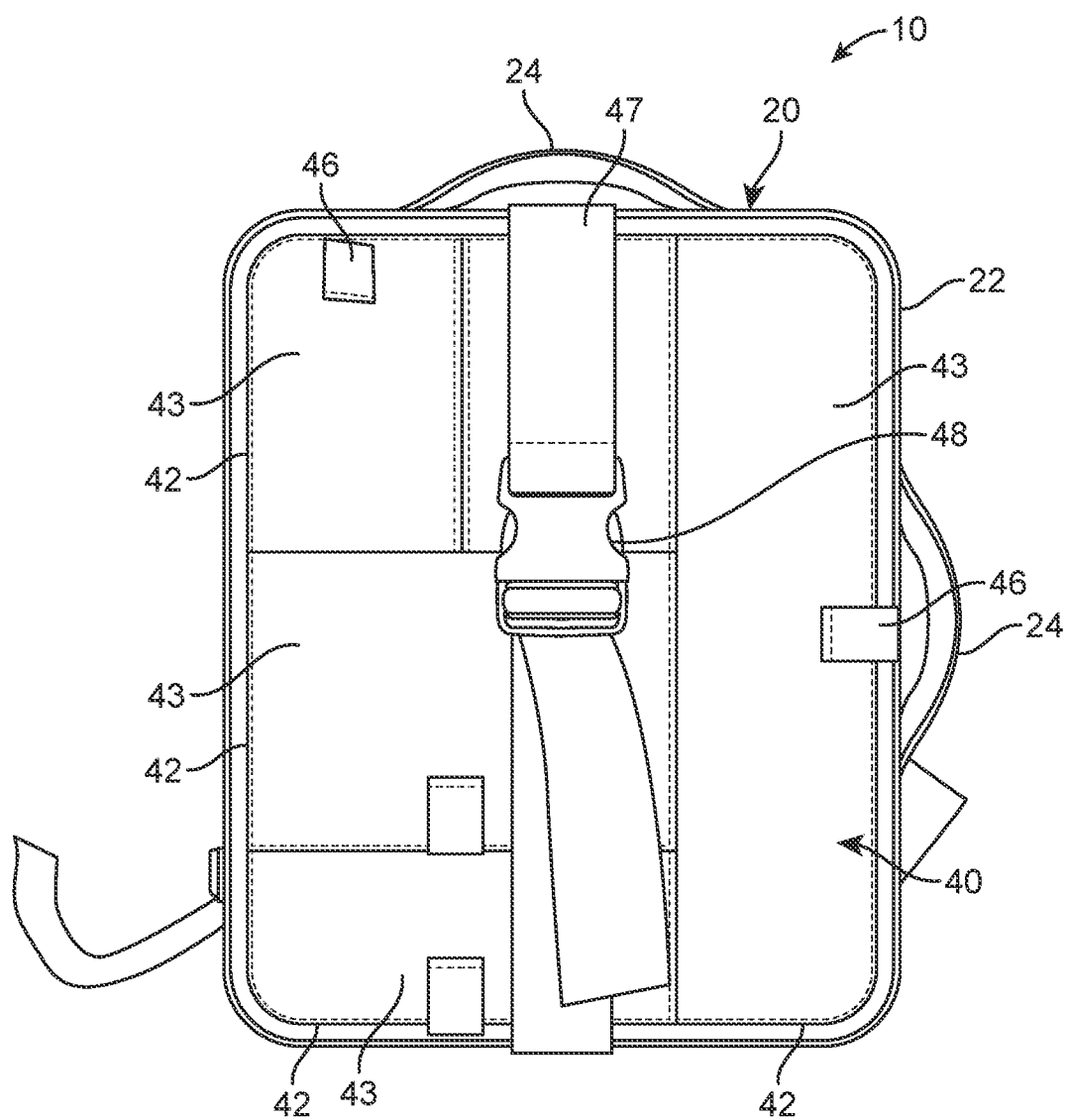
FIG. 1 represents a front view of modified carrier system 10 in accordance with an embodiment of the present invention.

Referring now to the drawings, where the present invention is generally referred to with numeral 10, it can be observed a modified carrier system 10 which basically includes a carrier assembly 20, a compartment assembly 40, a waist pack assembly 60, and a trolley assembly 80.

Carrier assembly 20 includes a carrier 22. In one embodiment, carrier 22 may be provided as having a substantially rectangular shape with a front end and a rear end. It should be understood that carrier 22 may be made of any suitable material. In one implementation, carrier 22 may be made of any suitable cloth or leather material, or any other material. Carrier 22 further includes carrying straps 23 which are disposed along the lateral sidewalls of carrier 22. As observed in FIG. 1, carrying straps 23 may be positioned along the top sidewall of carrier 22 as well as one of the later sidewalls of carrier 22. It should be understood that carrying straps 23 may be positioned anywhere along the sidewalls of carrier 22. In one embodiment, carrying straps 23 may be provided as leather members which are mounted onto carrier 22.

Figure 2:
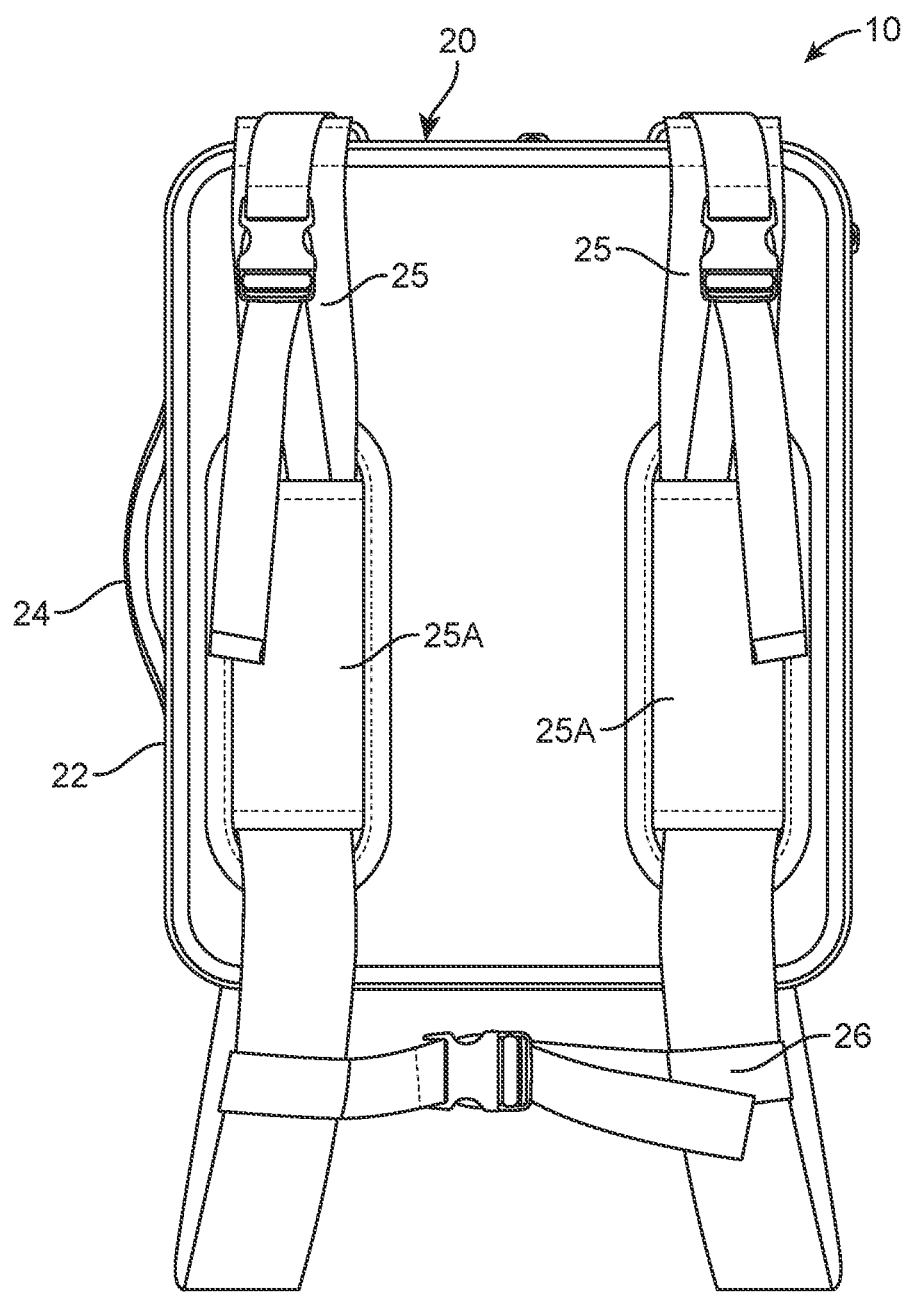
FIG. 2 shows a rear view of modified carrier system 10 in accordance with an embodiment of the present invention.

Carrier 22 further includes strap loops 24 positioned on a top sidewall thereon. As observed in FIG. 3, strap loops 24 are lopped leather members which then receive shoulder straps 25 mounted thereon. The present embodiment depicts two strap loops 24 positioned on carrier 22 which receive two shoulder straps 25 that are coupled to the strap loops 24 with metal circular members. FIG. 2 provides an accurate depiction for shoulder straps 25 in accordance to one embodiment of the present invention. Shoulder straps 25 include shoulder supports 25A. In one embodiment, shoulder supports 25A may be provided as padded or leather support members which are mounted onto shoulder straps 25. In the present embodiment, shoulder straps 25 are parallel strap members which enable a user to carry carrier 22 on their back. Shoulder supports 25A provide comfortable support on the shoulders when moving with carrier 22 on their back. Carrier 22 also includes a chest strap 26 which is mounted to shoulder straps 25. In the present embodiment, chest strap 26 is a horizontal strap member which connects bottom of shoulder straps 25 together. Each of the straps may be adjustable and provided with a buckle to aid in obtaining a preferred length to suit a user's needs. Chest strap 26 adds further securement and stability when carrier 22 is mounted onto a user's back.

Figure 3:
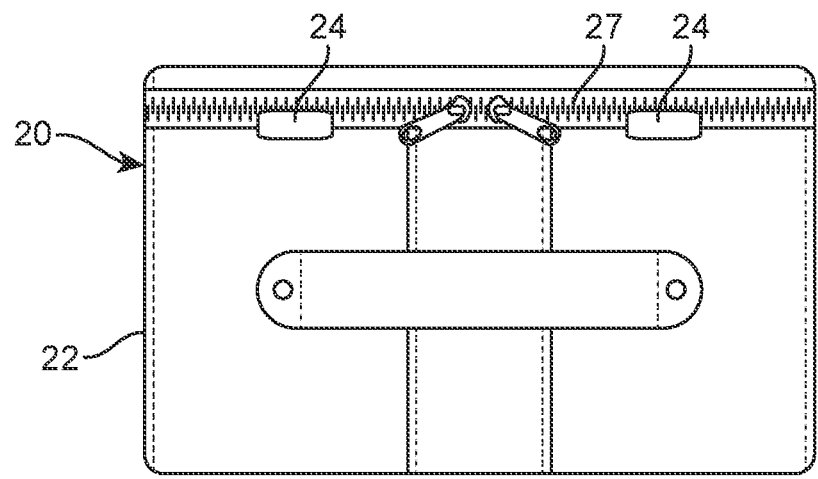
FIG. 3 illustrates a top view of carrier assembly 20 in accordance with an embodiment of the present invention.
Figure 4:
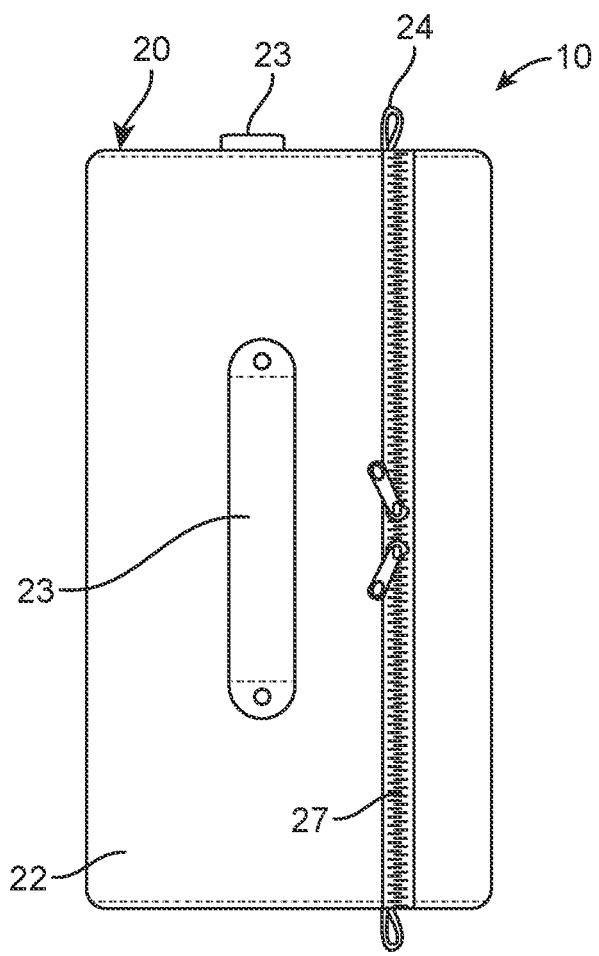
FIG. 4 is a representation of a side view of carrier assembly 20 in accordance with an embodiment of the present invention.
Figure 5:
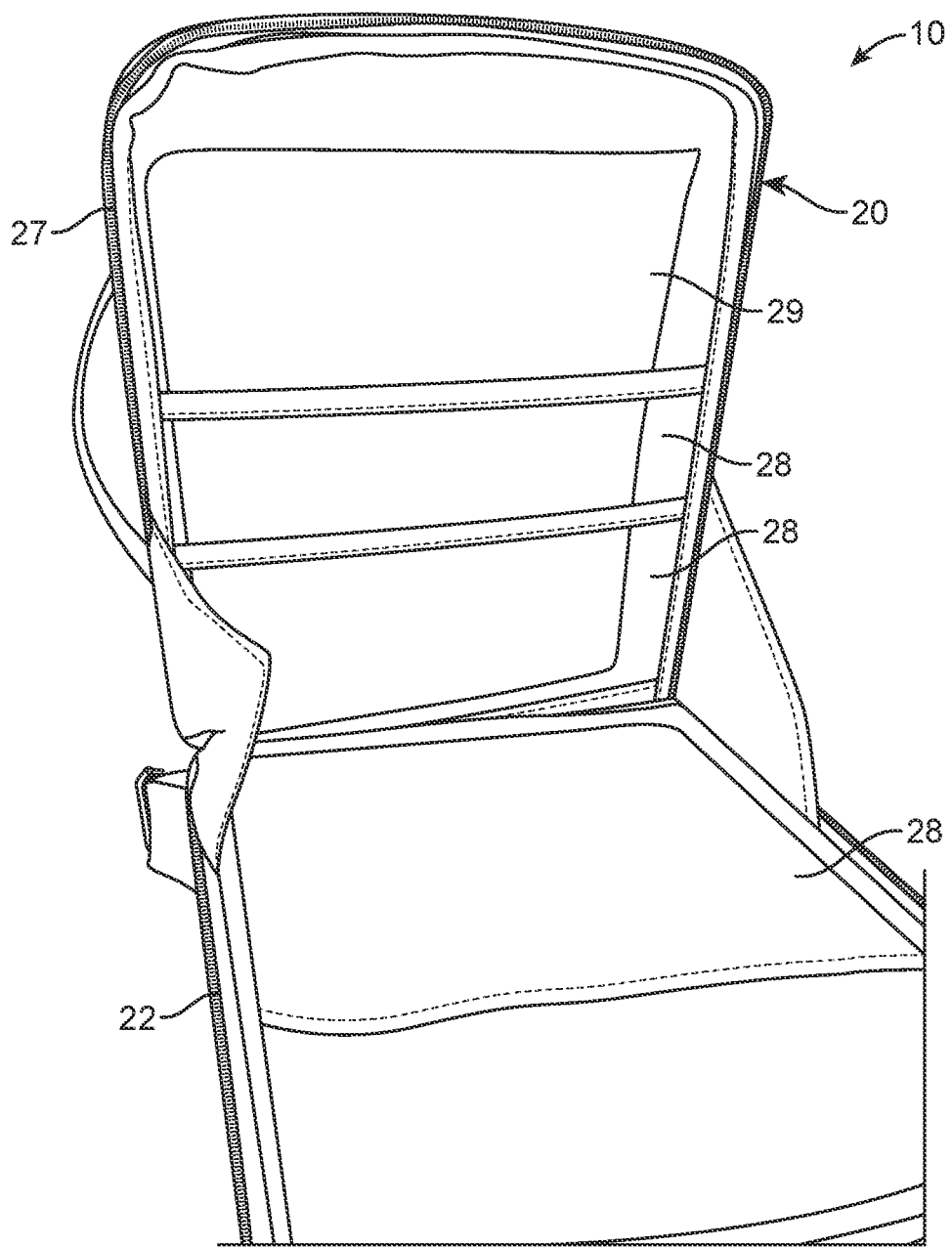
FIG. 5 shows an interior isometric view of carrier assembly 20 in accordance with an embodiment of the present invention.

As observed in FIGS. 3 and 4, carrier 22 further includes a zipper 27 which is positioned along the peripheral edges of thereof. In the present embodiment, zipper 27 is a traditional zipper seal structure, which when actuated, enables carrier 22 to be opened and reveals an interior portion. The interior portion of carrier 22 may be effectively observed in FIG. 5 in accordance with an embodiment of the present invention. The interior portion of carrier 22 includes a plurality of pockets 28 positioned therein. In one embodiment, pockets 28 are provided as clear pocket structures which are positioned along a first side and a second side of the interior of carrier 22. The clarity of the pockets 28 allows a user to more readily identify the contents such as books or notebooks or the like which may be stored within pockets 28. Furthermore, at least one of pockets 28 may contain a whiteboard 29 stored therein. In one embodiment, whiteboard 29 may be provided as a dry erase whiteboard which may be edited with markers. It should be understood that other embodiments of the present invention may include markers or other editable art materials therein to allow a user to draw or edit on whiteboard 29. Additionally, further embodiments of the present invention may include an electronic whiteboard such as a tablet.

Figure 6:
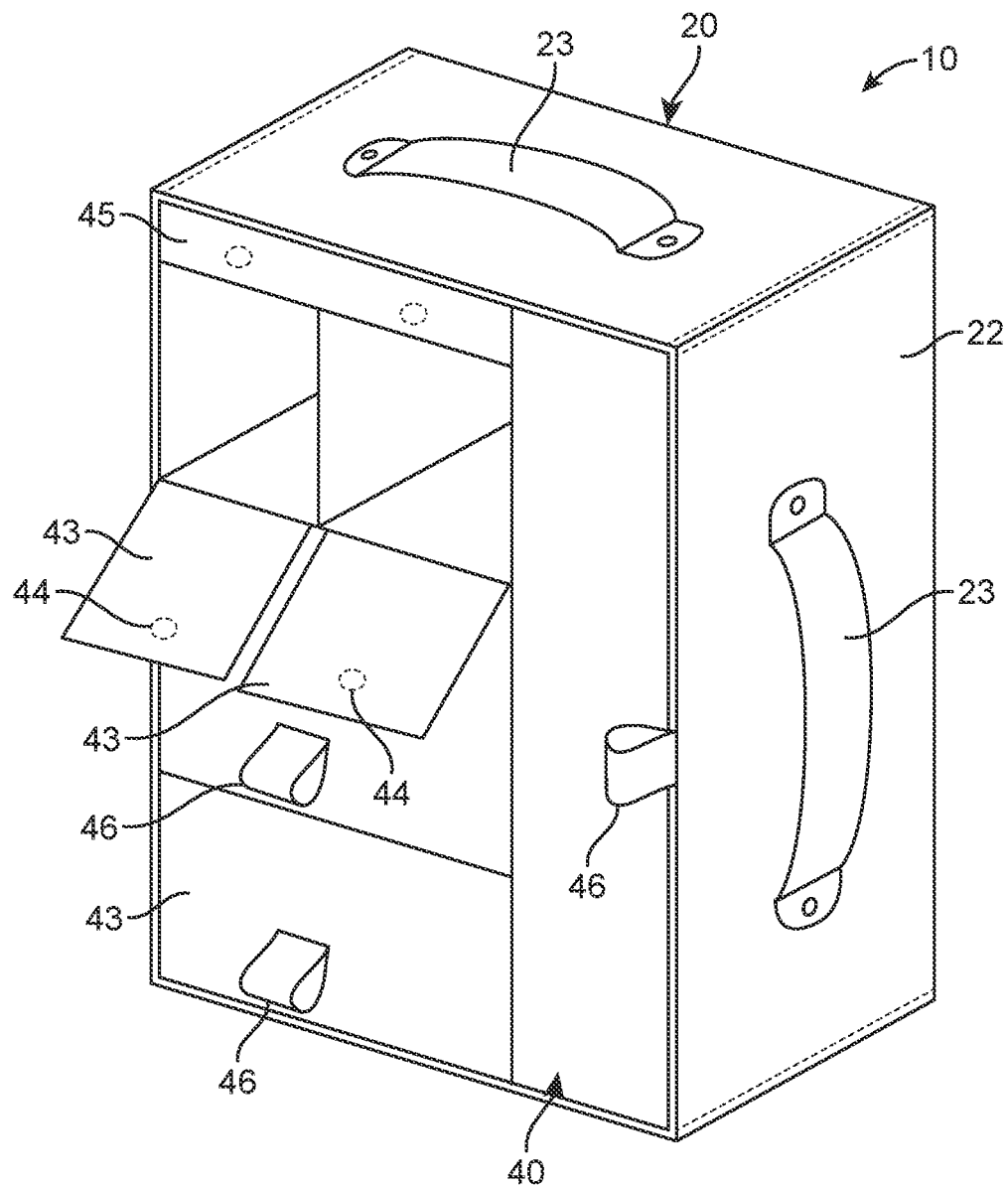
FIG. 6 illustrates an isometric view of carrier assembly 20 depicting compartment assembly 40 with plurality of compartments 42 in an open configuration in accordance with an embodiment of the present invention.
Figure 7:
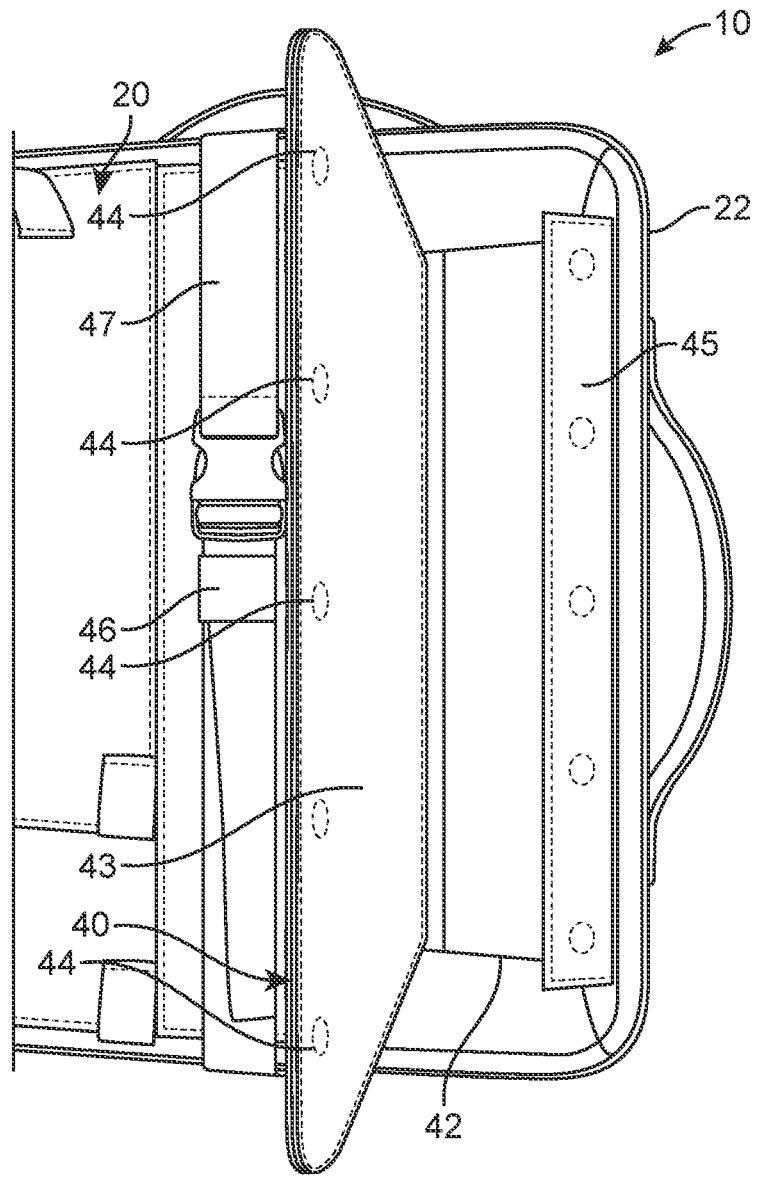
FIG. 7 represents an enlarged isometric view of compartment assembly 40 depicting a flap 43 of compartments 42 in an open configuration an also depicting the magnetic attachment members in accordance with an embodiment of the present invention.
Figure 8:
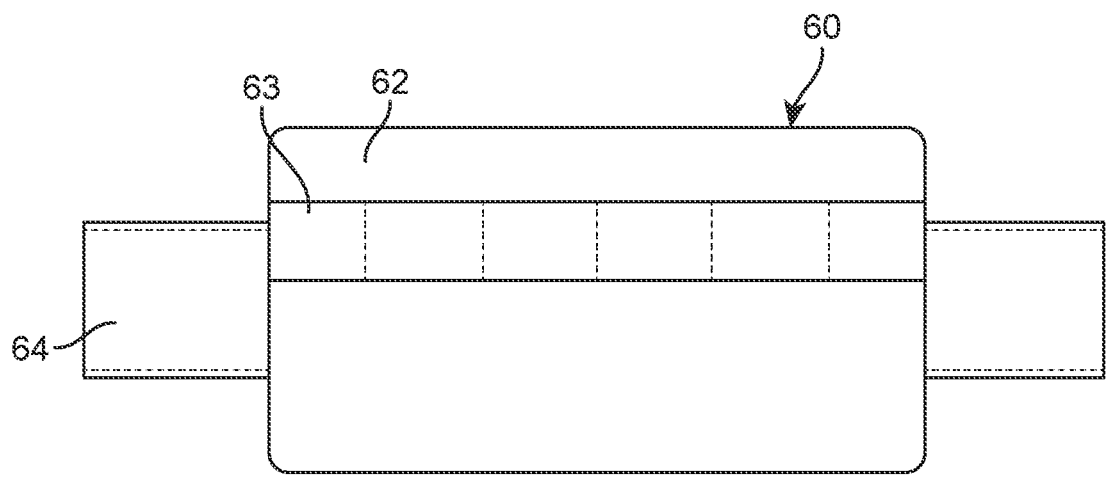
FIG. 8 shows a front view of waist pack assembly 60 in accordance with an embodiment of the present invention.
Figure 9:
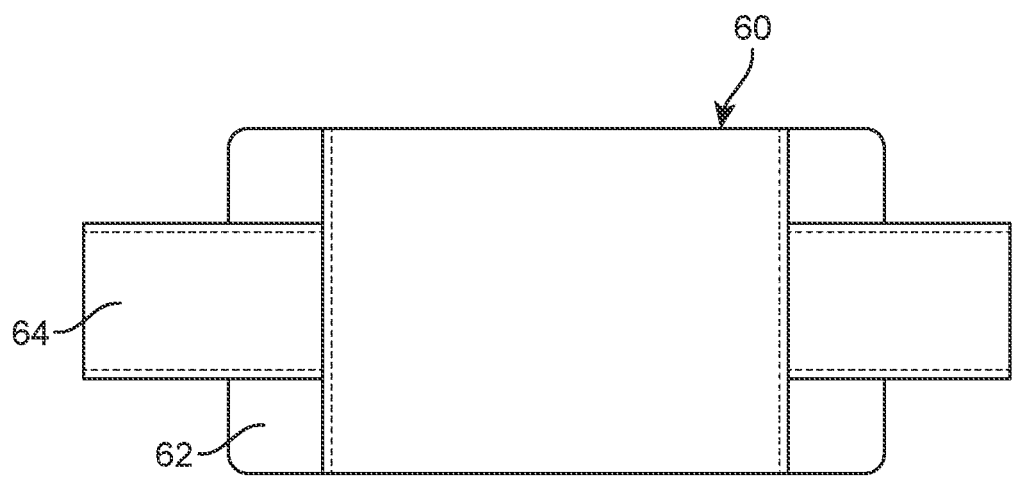
FIG. 9 illustrates a rear view of waist pack assembly 60 in accordance with an embodiment of the present invention.
Figure 10:
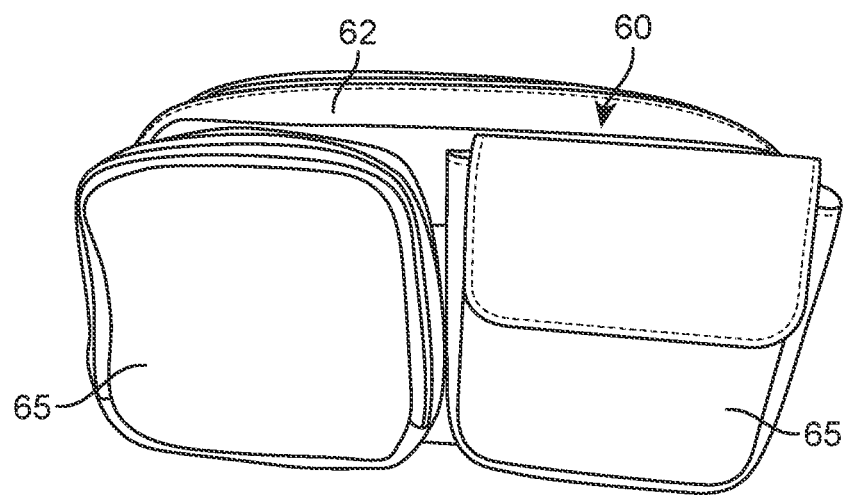
FIG. 10 is a representation of an isometric view of waist pack assembly 60 having containers 65 mounted to a front end in accordance with an embodiment of the present invention.
Figure 11:
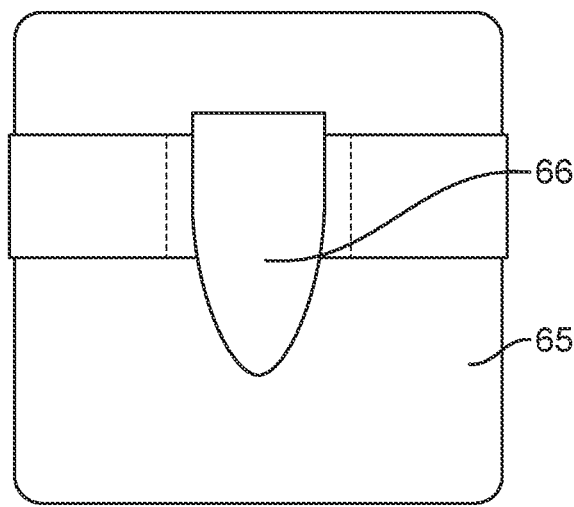
FIG. 11 shows a rear view of container 65 in accordance with an embodiment of the present invention.
Figure 12:
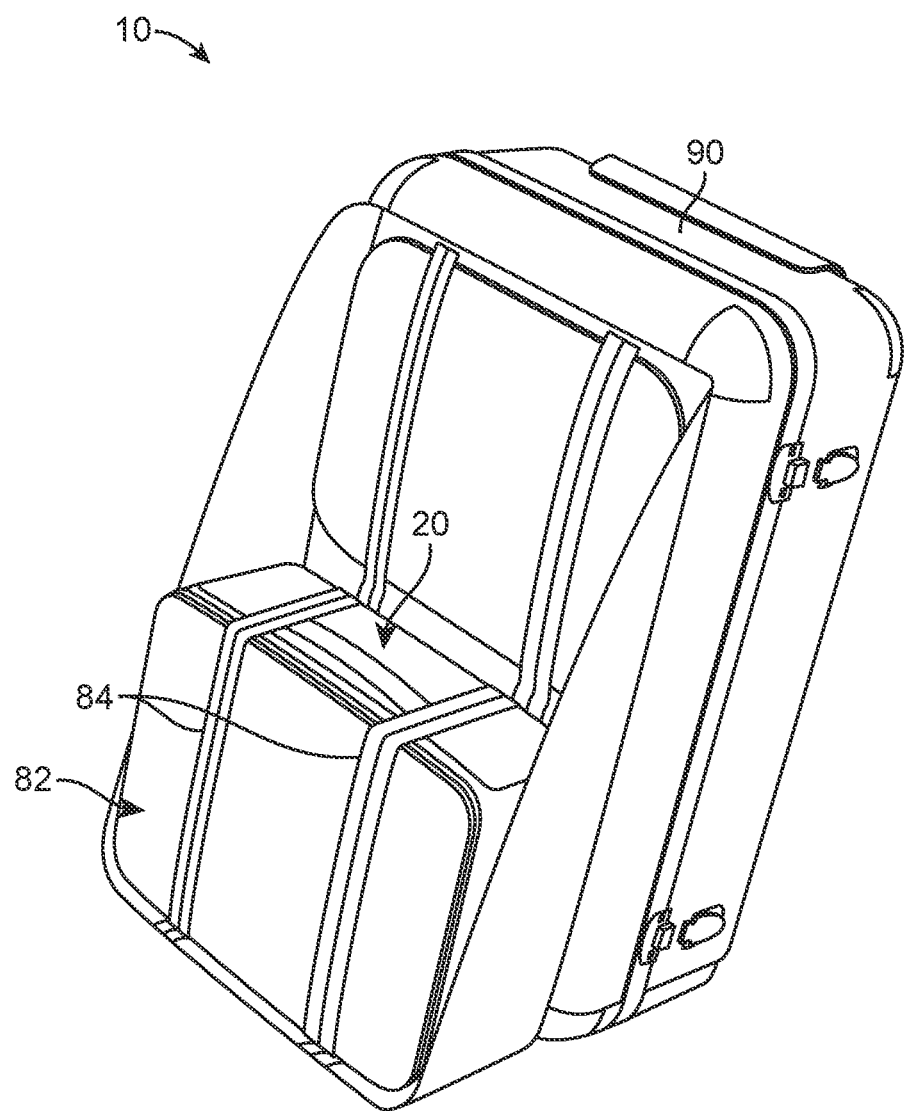
FIG. 12 illustrates an isometric view of trolley assembly 80 in an operational environment in accordance with an embodiment of the present invention.
Figure 13:
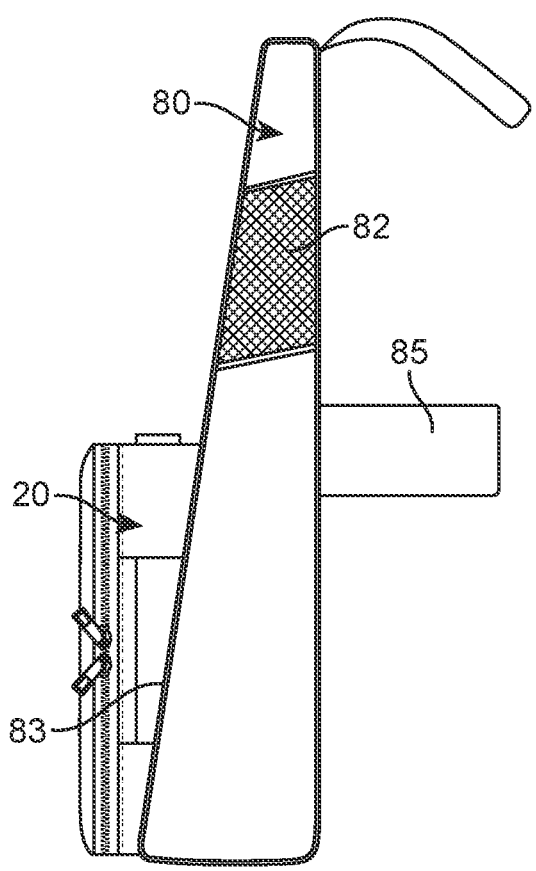
FIG. 13 represents a side view of sling device 82 in accordance with an embodiment of the present invention.
Figure 14:
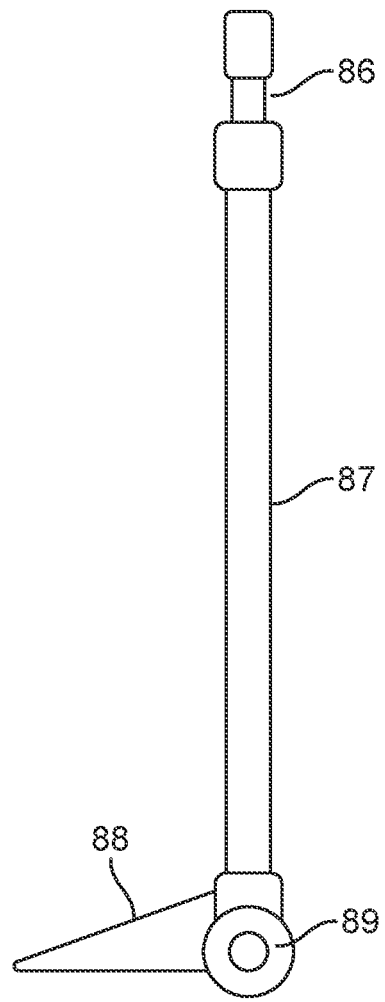
FIG. 14 shows a side view of trolley 86 in accordance with an embodiment of the present invention.
Figure 15:
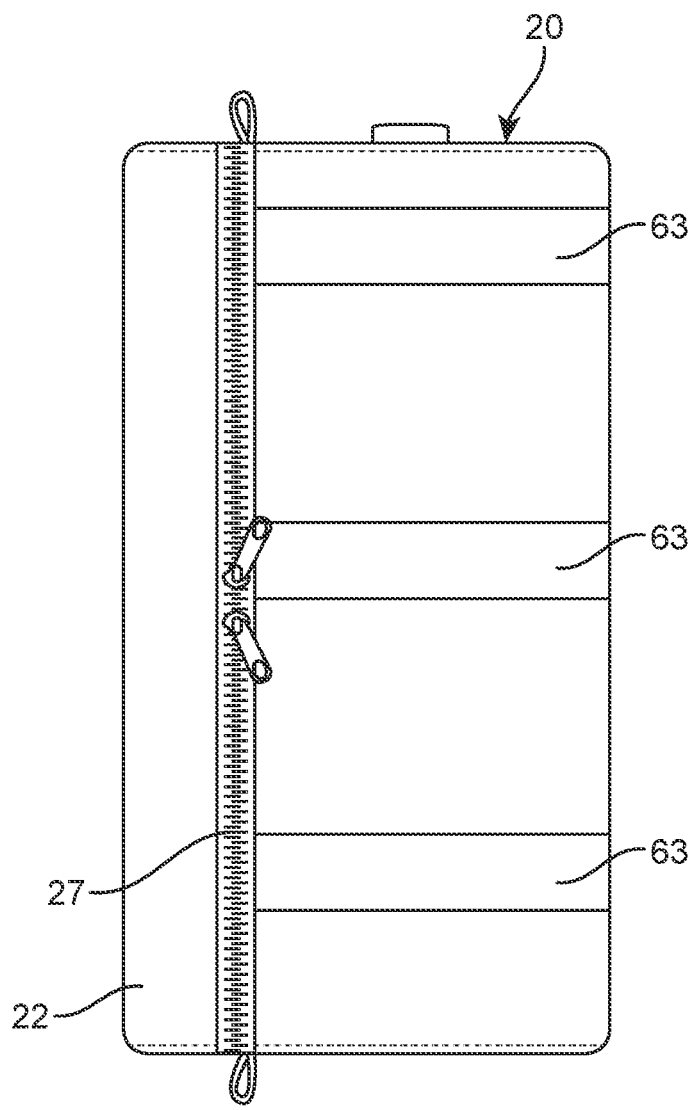
FIG. 15 illustrates a side view of carrier 22 in accordance with an embodiment of the present invention.
Figure 16:
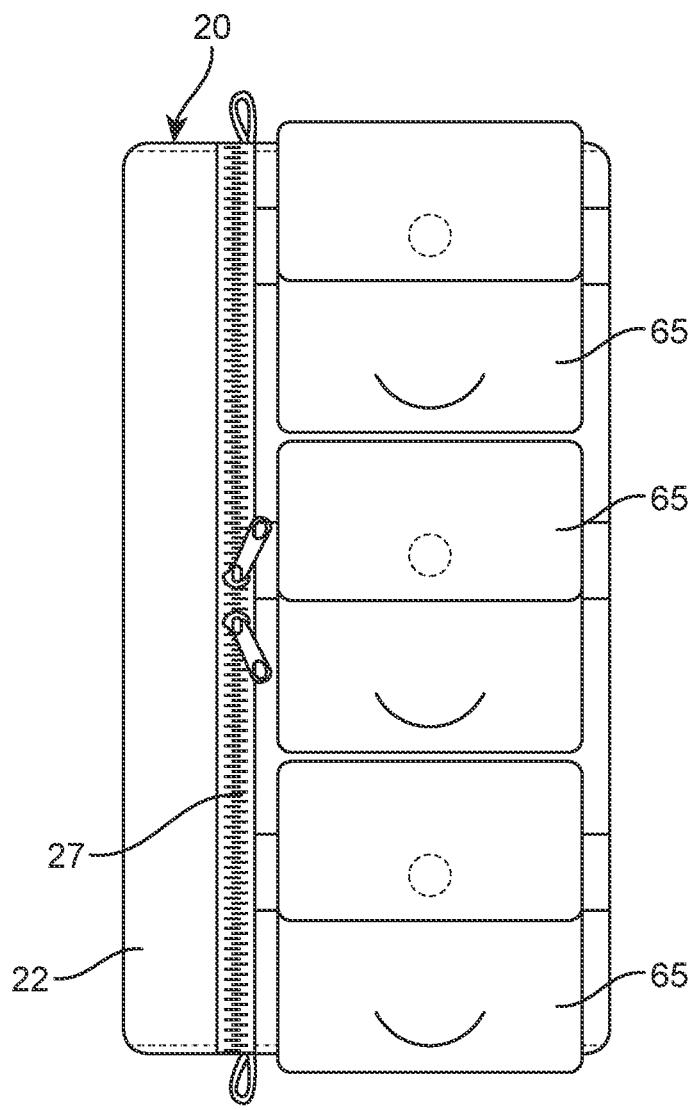
FIG. 16 is a representation of a side view of carrier 22 having compartments mounted thereon in accordance with an embodiment of the present invention.

Compartment assembly 40 includes a plurality of compartments 42 which are disposed along the front end of carrier 22. Compartment assembly 40 may be observed in FIG. 6 of the provided drawings. In one embodiment, compartments 42 are provided as rectangular compartment members which are embedded and recessed into carrier 22. Additionally, each of the compartments 42 includes a flap 43 hingedly mounted thereon having magnetic members 44 embedded therein. In one implementation, flap 43 is a rectangular cover member which entirely seals compartment 42 along the front end of carrier 22. FIGS. 6 and 7 each depict flap 43 having magnetic members 44 lined therein. Magnetic members 44 may be provided as circular magnets which are embedded within the lining of flap 43. Furthermore, the interior of each of compartments 42 are provided with a magnetic strip 45. Magnetic strip 45 may be provided as a strip member having magnets embedded therein similar to the structure of flap 43. In the present embodiment, magnetic strip 45 is positioned within the interior of compartment 42 and extends outwardly from a lateral sidewall thereof. It should be understood that the positioning of magnetic strip 45 should cooperate with the location of the magnetic members 44 that are embedded within flap 43. As a result, when flap 43 is actuated into a closed configuration, the magnetic members 44 within flap 43 are then magnetically locked and attached to the magnet members of magnetic strip 45 thereby enabling a sealed configuration. The provided magnetic seal structure prevents compartments 42 from accidently opening and dispensing its contents during transportation. Each of compartments 42 may also include a tab 46 operatively mounted to an outer surface of flap 43. Tab 46 may be provided as a structural member which aids a user in easily opening flap 43 be breaking the magnetic seal formed using a pulling force.

Compartment assembly 40 further includes a webbing strap 47 having a buckle 48. These elements may be properly observed in FIG. 1 of the provided drawings. In can be observed that webbing strap 47 is centrally located on the front end of carrier 22. Webbing strap 47 may be provided as a webbed strap which extends over the front end of carrier 22 and is also in constant abutting engagement thereon. Webbing strap 47 is provided to add further support to the sealing of compartments 42. In the present embodiment, webbing strap 47 acts as an additional seal that maintains compartments 42 in a closed position in the event that the magnetic sealing structure of the compartments should fail. Buckle 48 may then be used to easily disengage webbing strap 47 and provided a user with easy access to all of the compartments 42 on the front end of carrier 22.

Waist pack assembly 60 includes a pack 62 having an attachment loop 63 positioned along a front end thereof. Waist pack assembly 60 can be effectively observed in FIG. 8-11 of the provided drawings. As observed, attachment loop 63 is a structural member containing multiple loops which horizontally extends the front end of pack 62. Pack 62 further includes a strap 64 which is received along a rear end of pack 62. It should be understood that strap 64 may be provided as a buckled strap member which is used to operatively mount pack 62 to a user's waist. It should be understood that strap 64 may be provided being made of any suitable material.

Waist pack assembly 60 may further include at least one container 65 mounted to attachment loop 63. As observed in FIG. 10, container 65 may be provided as additional compartment members that can be used to store articles therein. Container 65 may be provided in different variations. One variation may include a zipper seal along a peripheral edge which can be actuated to provide access to an interior portion therein. Another variation may be provided has having a flap member which extends over a front portion to seal the container 65. This variation may also include magnetic seal members embedded within the flap and the front end of the container in order to operatively seal container 65. In one implementation, each of container 65 is provided with a clip 66 operatively positioned along a rear end as observed in FIG. 11. Clip 66 enables for containers 65 to be operatively mounted to attachment loop 63. Waist pack assembly 60 may be provided as part of the system for the modified luggage carrier 10 and provides additional storage for a guardian that is traveling with a child the is carrying the carrier assembly 20.

Trolley assembly 80 includes a sling device 82 which includes a back wall, curved sidewalls, and a front wall to then form a space 83. In one embodiment, sling device 82 is made of a sturdy and reinforced cloth material similar to that of carrier 22. Additionally, sling device 82 may have a substantially cubic rectangular shape with the front wall being lower than the back wall. Other embodiments may feature a sling device made of varying materials and having other shapes. In one implementation, space 83 is configured to receive carrier 22 therein. Space 83 must be of suitable dimensions such that carrier 22 fits snugly within space 83. Carrier 22 may then be inserted in a horizontal configuration or a vertical configuration. When carrier 22 is fitted snugly within space 83 it then forms a seat which may be adapted for use by a child. It should be understood that carrier 22 may be inserted within space 83 in any configuration such that it forms a comfortable seating area for a child. The sling device additionally includes securing straps 84 positioned along the front end of sling device 82. In one embodiment, securing straps 84 may be provided as rectangular adjustable cloth straps or leather straps or any other variation of straps. Securing straps 84 aid to secure carrier 22 within space 83. Furthermore, securing straps 84 may also be utilized to secure a child when they are seated within sling device 82. Other embodiments may feature other forms of straps and securing means to secure carrier 22 and a child. Sling device 82 further includes coupling straps 85 located on a back end of sling device 82. In one implementation, coupling straps 85 may be horizontally configured cloth straps or any variation of straps which are adjustable. Additionally, coupling straps 85 are used to communicably mount sling device 82 onto a trolley 86 in order to form a transportation system. Additionally, coupling straps 85 may be communicably mounted onto an existing wheeled luggage 90 in order to form another form of transportation system. A user may then utilize this transportation system to then transport a child.

Trolley 80 further includes a vertical structure 87 having a top end and a bottom end. In one embodiment, vertical structure 87 is made of a durable metallic material suitable to support sling device 82. Vertical structure 87 may also include a handle located at a top end. This handle may be telescopic in nature allowing a user to adjust the handle to a comfortable height when transporting a child. Additionally, a platform 88 is then mounted onto a bottom end of vertical structure 87. This platform 88 may be a horizontal platform made of the same metallic material as vertical structure 87. Platform 88 must be of a suitable length to comfortably receive a bottom end of sling device 82. In one embodiment, platform 88 only partially receives sling device 82. In another embodiment, platform 88 entirely receives sling device 82 to create a secure mounting means. Additionally, wheels 89 are then provided at the bottom end of vertical structure 87 connecting both platform 88 and vertical structure 87 together. The present invention is not limited to the use of two wheels 89. Any number of wheels 89 may be provided for the optimization of the transportation system. Additionally, wheels 89 may also be provided on the sling device 82. Trolley 86 provides the most efficient structure to receive sling device 82 and create an easy-to-use transportation system. Modified luggage system then provides a user with an effective storage area and an effective transportation means for a child.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

INDUSTRIAL APPLICABILITY

The present invention has several implementations for industrial applicability. In one embodiment, the modified luggage carrier is provided in department or online stores which sell luggage and carriers. The modified luggage carrier provides easily accessible compartments for a child which are located on the front face of the carrier. This allows for articles to be more readily accessible to the child over other types of carriers. Each of the compartments include a flap hingedly engaged with their respective compartment. The flaps are lined with magnetic members which are engaged to a magnetic locking strip located within the compartment to effectively seal each compartment. A webbing strap is then secured over the front face of the carrier to provide support over the compartments. Additionally, a waist pack ecosystem is included with the system. The waist pack receives a plurality of compartments that can be mounted thereon. The waist pack assembly is beneficial in providing additional storage to a parent or guardian associated with the child having the carrier. A sling assembly and trolley assembly may also be included with system to effectively create an enjoyable seating transportation means for a child.

What is claimed is:

1. A system for a modified luggage carrier, comprising:
   a) a carrier assembly including a carrier having a front end and a rear end; and
   b) a compartment assembly including a plurality of compartments disposed and recessed within said front end of the carrier, wherein each of said compartments include a flap having magnetic members embedded therein, each of said compartments further including a strip being embedded with magnetic members positioned along an interior sidewall therein, said flap being magnetically attached to said strip to form a magnetic seal, wherein said plurality of compartments are flush along said front end of the carrier, wherein said flap includes a tab mounted thereon, wherein said compartment assembly further includes a webbing strap centrally located along the front end of said carrier, said webbing strap being in constant abutting contact with said front end, wherein said webbing strap further includes a buckle adapted to allow a user to selectively unlock said webbing strap.

2. The system for the modified luggage carrier of claim 1 wherein said carrier includes carrying straps positioned along lateral sidewalls of said carrier, wherein a top end of said carrier includes strap loops.

3. The system for the modified luggage carrier of claim 2 wherein said strap loops includes shoulder straps mounted thereon, wherein said shoulder straps includes padded shoulder supports mounted thereon.

4. The system for the modified luggage carrier of claim 3 wherein said shoulder straps further includes a chest strap which horizontally extends across said shoulder straps.

5. The system for the modified luggage carrier of claim 1 wherein said carrier further includes a zipper positioned along a peripheral edge of said carrier which when actuated provides access to an interior portion of said carrier, said interior portion of the carrier including a plurality of pockets located along interior sidewalls of said interior portion.

6. The system for the modified luggage carrier of claim 5 wherein said pockets are clear pockets, wherein at least one of said pockets includes a whiteboard mounted therein, wherein said whiteboard is a dry erase white board.

7. The system for the modified luggage carrier of claim 1 wherein said plurality of compartments are cuboid compartments defined by four sidewalls which are entirely recessed within said front end of the carrier, wherein said flap is flush with the front end of said carrier.

8. The system for the modified luggage carrier of claim 1 further including a waist pack assembly, said waist pack assembly including a pack having an attachment loop disposed along a front end, said pack further including a strap which runs through a rear end of said pack.

9. The system for the modified luggage carrier of claim 8 wherein said pack includes at least one container mounted to said pack, wherein said at least one container includes a clip mounted to a rear end, wherein said clip is operatively mounted to said attachment loop of said pack.

10. The system for the modified luggage carrier of claim 1 further including a trolley assembly, said trolley assembly including a sling device which defines a spacing, said carrier being mounted within said spacing to form a seat.

11. The system for the modified luggage carrier of claim 10 said carrier being secured within said spacing with securing straps, said sling device further including coupling straps adapted to receive a luggage.

12. The system for the modified luggage carrier of claim 10 further including a trolley having a platform and wheels which operatively engages with said sling device to form a transportation system.

13. A system for a modified luggage carrier, comprising:
a) a carrier assembly including a carrier having a front end and a rear end;
b) a compartment assembly including a plurality of compartments disposed and recessed within said front end of the carrier, wherein each of said compartments include a flap having magnetic members embedded therein, each of said compartments further including a strip being embedded with magnetic members positioned along an interior sidewall therein, said flap being magnetically attached to said strip to form a magnetic seal, wherein said plurality of compartments are flush along said front end of the carrier, wherein said plurality of compartments are cuboid compartments defined by four sidewalls which are entirely recessed within said front end of the carrier, wherein said flap is flush with the front end of said carrier; and
c) a trolley assembly including a trolley having a platform and wheels, and a sling device which defines a spacing, said carrier being mounted within said spacing to form a seat, said carrier being secured within said spacing with securing straps, said sling device further including coupling straps for operatively engaging with the trolley to form a transportation system, the coupling straps adapted to alternately receive a luggage for forming a different transportation system.

14. The system for the modified luggage carrier of claim 13 wherein said flap includes a tab mounted thereon.

15. The system for the modified luggage carrier of claim 13 wherein said compartment assembly further includes a webbing strap centrally located along the front end of said carrier, said webbing strap being in constant abutting contact with said front end, wherein said webbing strap further includes a buckle adapted to allow a user to selectively unlock said webbing strap.

16. The system for the modified luggage carrier of claim 13 further including a waist pack assembly, said waist pack assembly including a pack having an attachment loop disposed along a front end, said pack further including a strap which runs through a rear end of said pack.

17. The system for the modified luggage carrier of claim 16 herein said pack includes at least one container mounted to said pack, wherein said at least one container includes a clip mounted to a rear end, wherein said clip is operatively mounted to said attachment loop of said pack.

18. A system for a modified luggage carrier, consisting of:
a) a luggage;
b) a carrier assembly including a carrier having a front end and a rear end, wherein said carrier includes carrying straps positioned along lateral sidewalls of said carrier, wherein a top end of said carrier includes strap loops, wherein said strap loops includes shoulder straps mounted thereon, wherein said shoulder straps includes padded shoulder supports mounted thereon, wherein said shoulder straps further includes a chest strap which horizontally extends across said shoulder straps, wherein said carrier further includes a zipper positioned along a peripheral edge of said carrier which when actuated provides access to an interior portion of said carrier, said interior portion of the carrier including a plurality of pockets located along interior sidewalls of said interior portion, wherein said pockets are clear pockets, wherein at least one of said pockets includes a whiteboard mounted therein, wherein said whiteboard is a dry erase white board;
c) a compartment assembly including a plurality of compartments disposed and recessed within said front end of the carrier, wherein each of said compartments include a flap having magnetic members embedded therein, each of said compartments further including a strip being embedded with magnetic members positioned along an interior sidewall therein, said flap being magnetically attached to said strip to form a magnetic seal, wherein said plurality of compartments are flush along said front end of the carrier, wherein said plurality of compartments are cuboid compartments defined by four sidewalls which are entirely recessed within said front end of the carrier, wherein said flap is flush with the front end of said carrier, wherein said flap includes a tab mounted thereon, wherein said compartment assembly further includes a webbing strap centrally located along the front end of said carrier, said webbing strap being in constant abutting contact with said front end, wherein said webbing strap further includes a buckle adapted to allow a user to selectively unlock said webbing strap;
d) a waist pack assembly including a pack having an attachment loop disposed along a front end, said pack further including a strap which runs through a rear end of said pack, wherein said pack includes at least one container mounted to said pack, wherein said at least one container includes a clip mounted to a rear end, wherein said clip is operatively mounted to said attachment loop of said pack; and e) a trolley assembly including a sling device which defines a spacing, said carrier being mounted within said spacing to form a seat, said carrier being secured within said spacing with securing straps, said sling device further including coupling straps adapted to receive said luggage, wherein said trolley assembly further includes a trolley having a platform and wheels which operatively engages with said sling device to form a transportation system.

\* \* \* \* \*